United States Patent [19]

Lange

[11] 4,370,040
[45] Jan. 25, 1983

[54] REMOVABLE LINK FOR A CARRYING STRAP

[75] Inventor: Karl-Heinz Lange, Bunde, Fed. Rep. of Germany

[73] Assignee: Balda-Werke Photographische Gerate und Kunststoff GmbH & Co., KG, Bunde, Fed. Rep. of Germany

[21] Appl. No.: 301,338

[22] Filed: Sep. 11, 1981

[30] Foreign Application Priority Data

Sep. 11, 1980 [DE] Fed. Rep. of Germany ....... 3034123

[51] Int. Cl.³ .............................................. G03B 17/02
[52] U.S. Cl. ..................................... 354/288; 224/908
[58] Field of Search .................. 354/202, 288; 24/223, 24/230 R, 230 AK; 224/252, 255, 256, 269, 908

[56] References Cited

U.S. PATENT DOCUMENTS

| | | | |
|---|---|---|---|
| 3,631,572 | 1/1972 | Lange | 24/223 |
| 3,741,092 | 6/1973 | Bohnnec | 224/908 |
| 3,777,639 | 12/1973 | Lange | 354/288 |
| 3,870,209 | 3/1975 | Mazur | 224/908 |
| 3,882,576 | 5/1975 | Kanno | 354/288 |
| 4,247,028 | 1/1981 | Maitani et al. | 354/288 |

Primary Examiner—L. T. Hix
Assistant Examiner—Alan Mathews
Attorney, Agent, or Firm—Blum, Kaplan, Friedman, Silberman & Beran

[57] ABSTRACT

A removable assembly for attaching a carrying strap or similar member to a camera or other article is provided. The assembly includes a thin planar link having an opening therethrough which extends into an opening slit in the forward or coupling end of the link. The opening slit has a width which is smaller than the largest width of the opening. A cooperating stepped-locking pin positioned in the camera or other article has one dimension which is thicker than the width of the slit and smaller than the largest width of the opening and a second dimension smaller than the width of the slit. The faces of the opening slit are inclined with respect to the link surface and the locking pin has a cooperating inclined surface between the strap for permitting displacement of the pin within the article body as the link is inserted into the article in a direction transverse to the longitudinal axis of the pin. The pin is biased within the article body so that the larger diameter is urged to a position passing through the opening when the link is inserted into the article. The link assembly can be removed from the article by displacing the pin within the opening in the article body to permit the link to be withdrawn from engagement with the pin.

12 Claims, 5 Drawing Figures

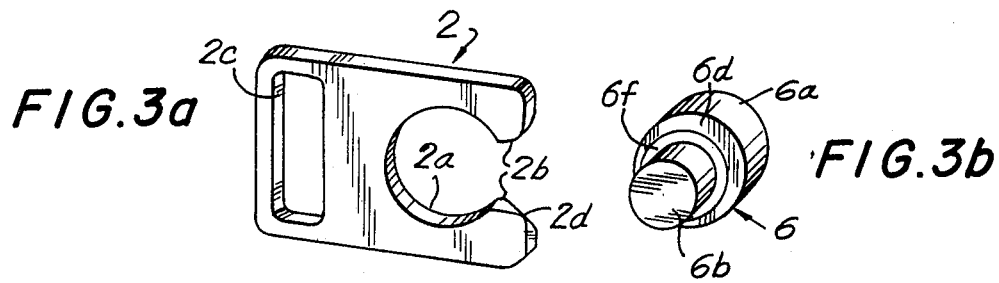
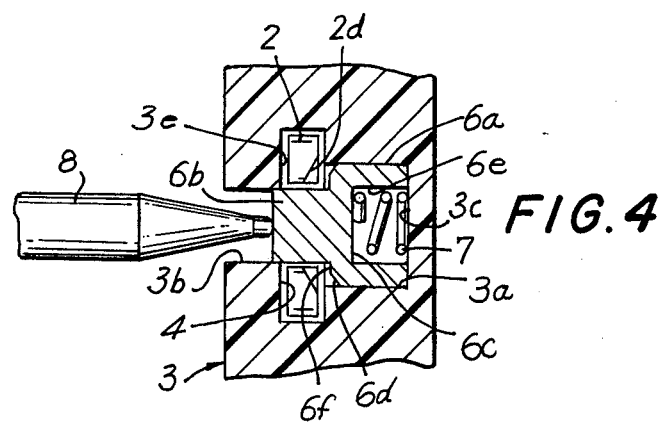
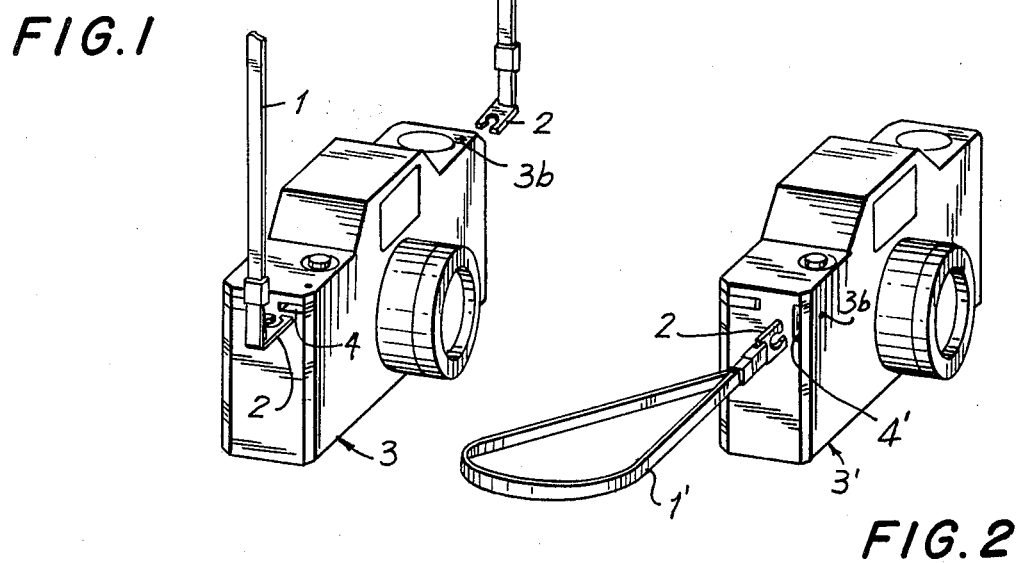

REMOVABLE LINK FOR A CARRYING STRAP

BACKGROUND OF THE INVENTION

This invention relates to a removable link, and more particularly to a removable link for attaching a carrying strap or similar member to an article, such as a camera body.

Conventionally, there are two different principles for fixing a member to an article, such as a strap to a camera body. Under the first principle, recesses are provided in the camera body into which holders or clamps are inserted for attaching to the ends of the carrying strap. This is true with respect to the receiving openings for connector straps which grip behind pins that are counter-sunk in the receiving openings. It is also known to attach locking elements which are insertable in an opening in a first position, and then, in relation to that first position, are rotated by 90 degrees as shown in U.S. Pat. No. 3,777,639. It is in the 90 degrees twist position that the locking elements are fixed to the article. These known solutions are disadvantageous in that the receiving openings in the camera compartment tend to be relatively large.

The same disadvantages are present with respect to bolted connections. Such connections require relatively large screw openings in the article. Moreover, such couplings tend to become loose inadvertently.

In another known coupling principle, a camera compartment is provided with protruding parts, such as grommets, camera accessory shoes, or similar elements which are coupled to corresponding counter pieces as shown in U.S. Pat. No. 3,631,572. Basically, all these solutions are not entirely satisfactory as they prevent the camera body from being formed with smooth walls. Each of these alternatives requires that the camera body surface provides protruding regions.

Accordingly, it is desirable to provide a removable linking assembly for affixing a member, such as a carrying strap to an article, such as a camera body. Such a removable linking assembly would permit constructing the article having a smooth walled construction and, on the other hand minimally interfere with the surface contour.

SUMMARY OF THE INVENTION

A removable linking assembly for attaching a carrying strap or similar member to a camera body is provided. The linking assembly includes a thin, substantially planar clip which requires a small slide-slot adapted to receive the thickness of the clip. The thin slot does not disturb or interrupt the smooth surface of the camera body. Additionally, such a solution for affixing a camera strap or similar member permits mounting the member almost anywhere on the camera body where desired.

The linking assembly in accordance with the invention includes a substantially planar link formed with a passage therethrough which extends to an opening slit at the coupling end of the link. The opposite end of the link is formed with a mounting grommet for receiving the camera strap or other member to be mounted to the camera body. A stepped-locking pin is spring mounted within a bore or recess in the camera wall biased towards the outer surface of the wall. The pin has a smaller dimension smaller than the opening slit and a larger dimension larger than the opening slit, but smaller than the passage. A slot transverse to the locking pin receives the link with the opening slit passing over the smaller diameter of the pin. The pin is displaceable into the wall as the link is further inserted with the pin being displaced towards the outer wall when the groove is aligned with the larger pin. The dimension of the link is prevented from being withdrawn from the camera wall as the larger diameter of the link engages the larger diameter of the pin and held in this position by the smaller dimension of the opening slit. The link may be withdrawn by displacing the pin towards the bottom of the bore so that the smaller dimension of the opening slit can pass over the small dimension of the locking pin.

A camera can be formed with one or two slits for receiving the camera strap on one or both side walls of the camera body.

Accordingly, it is an object of the invention to provide an improved removable assembly for attaching a member to an article.

It is a further object of the invention to provide an improved removable assembly for attaching a carrying strap to a camera body.

It is another object of the invention to provide an improved removable link assembly for attaching a carrying strap to a camera which does not interfere with the smooth exterior surface of the camera body.

Still another object of the invention is to provide an improved removable link assembly for attaching a carrying strap to a camera body which may be readily secured to and removed from the camera body.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of a camera having two horizontal receiving slots for receiving the assembly for attaching a carrying strap to the camera body in accordance with the invention;

FIG. 2 is a perspective view of a camera having a single vertical receiving slot for receiving the assembly for mounting a carrying strap to the camera in accordance with the invention;

FIG. 3a is a perspective view of a link constructed and arranged in accordance with an embodiment of the invention;

FIG. 3b is a perspective view of a cooperating locking pin constructed and arranged in accordance with the invention for engaging the link of FIG. 3a; and FIG. 4 is a partial cross-sectional view through the locking pin illustrating the assembly in the wall of a camera body in accordance with the embodiment illustrated in FIG. 2.

DESCRIPTION OF THE PREFERRED EMBODIMENTS

In FIG. 1, a camera body 3 is provided with a pair of horizontally disposed slots 4 for receiving a link 2 of the link assembly for mounting a camera strap 1 to camera body 3 in accordance with the invention. Each slot 4 leads to bore 3b formed in the camera wall. In FIG. 1, bore 3b is on the upper surface of the camera and aids in removal of link 2 as will be described in more detail below. In the embodiment illustrated in FIG. 1, when camera strap 1 is attached to camera body 3 at each slot 4, camera strap 1 may be worn about a user's neck or shoulder.

In an embodiment illustrated in FIG. 2, both ends of a hand carrying strap 1' are mounted on one link 2 for mounting to camera body 3' at a vertically oriented slot 4' formed on a side of camera 3'. A cooperating bore 3b' is formed on the front wall of camera body 3'. The construction of the link and pin of the assembly in each embodiment is identical and will now be described in detail.

Referring specifically to FIG. 3a, link 2 constructed and arranged in accordance with the invention is shown. Link 2 is a thin, substantially planar metallic link having a grommet 2c at its outer end for receiving camera strap 1 or 1'. The front or mounting end of link 2 is formed with a passage 2a, which as shown in the illustrated embodiment is a circular passage therethrough. Passage 2a extends to an open slit 2b at the front end of link 2. The dimension of opening slit 2b is smaller than the width or diameter of passage 2a.

A cooperating locking pin which is mounted within camera wall 3 is shown in FIG. 3b. Locking pin 6 is a substantially cylindrical, stepped pin. Locking pin 6 includes a rear portion or step 6a having a larger diameter than the front portion or step 6b for forming a transverse shoulder 6f. An inclined region extends from shoulder 6f to rear step 6a to assist in displacement of locking pin 6 in a manner which will be described in more detail below.

Locking pin 6 is formed with a blind hole 6e at its rear portion having a bottom wall 6 for receiving one end of a return spring 7. The opposite end of return spring 7 is biased against a bottom wall 3c of bore 3b which extends to a larger rear bore 3a in the wall of camera body 3. Bore 3b is provided on the front surface of the top or front of camera body 3 or 3', respectively. The forward end of the larger rear bore 3a is traversed by transverse slot 4 which extends from the side of the camera body for receipt of link 2.

Prior to insertion of link 2 into slot 4, locking pin 6 is biased towards the outer surface of camera wall 3 by return spring 7. When locking pin is in this position, shoulder 6f abutts the front wall 3e of slot 4. The opposed faces of slit 2b are formed with oblique surfaces 2d inclined with respect to the planar surfaces of link 2. Oblique surfaces 2d are inclined in the same direction as inclined region 6d on locking pin 6. Thereby, it is possible to slide link 2 into slot 4 without the aid of a mounting tool. When link 2 is inserted into slot 4, locking pin 6, which initially is at the forward position away from bottom wall 3c, is displaced towards bottom wall 6c by inclined regions 2d until link 2 is inserted fully into slot 4. At this time, locking pin 6 is biased to its locking position by return spring 7 where it lies with its shoulder 6f abutting front wall 3e. When return ring has been displaced to this forward position, link 2 cannot be withdrawn from slot 4 as the dimension of opening slit 2b is smaller than the dimension of rear step 6a.

In order to remove link 2, it is necessary to use a stylus, such as a pencil or pen, and pass it through small bore 3b up to the front side of locking pin 6. This permits displacement of locking pin 6 into the position as shown in FIG. 4 against bottom wall 3c. When pin 6 is displaced to this position, link 2 may be withdrawn from slot 4 as the diameter of front step 6b is smaller than the width of opening slit 2b.

Thus, a removable link assembly for attaching a carrying strap or similar member to a camera or other article is provided. By providing a link having a groove and opening slit for engaging a stepped locking pin mounted within the article wall, a removable link assembly which does not interrupt the outer surface of the article is readily provided. This step may be attached without the need for mounting tools. Additionally, a secure coupling between the link and pin is readily assured while permitting easy removal of the link.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An assembly for mounting a member to the wall of a camera body, comprising
   a substantially planar link having a forward linking end and a rear mounting end for receiving the member, the link formed with a passage therethrough which extends into an opening slit in the linking end, the width of the opening slit being less than the largest dimension of the passage, and
   a locking pin displacable in a direction transverse to the link, the locking pin being a stepped pin having a first dimension smaller than the width of the opening slit of the link and a second larger dimension greater than the width of the opening slit and smaller than the largest dimension of the passage,
   the pin mounted within the camera wall and the outer surface of the camera wall formed with a cooperating slot for receiving the link, the pin adapted to be positioned through the passage in the link.

2. The assembly of claim 1, wherein the pin is mounted in the camera wall and biased towards the outer surface thereof.

3. The assembly of claim 2, further including a return spring for biasing the pin to the outer surface of the camera body.

4. The assembly of claim 3, wherein the pin includes a blind hole in the bottom wall of the pin for receiving the return spring.

5. The assembly of claim 1, wherein the locking pin is a substantially cylindrical pin with the different dimensions being different diameters with a transverse shoulder region therebetween.

6. The assembly of claim 5, wherein the camera body includes a substantially cylindrical bore having two diameters to correspond to the two dimensions of the locking pin.

7. The assembly of claim 6, wherein the larger dimension of the bore is on the inner side of the wall and the smaller dimension of the bore is on the outer surface of the wall.

8. The assembly of claim 7, wherein the slot for receiving the link transverses the bore in the region between the two dimensions of the bore.

9. The assembly of claim 1, wherein the link is formed of a metallic material.

10. The assembly of claim 9, wherein the link includes a grommet at the end opposed to the mounting end for receipt of the member.

11. The assembly of claim 10, wherein the member is a camera strap.

12. The assembly of claim 5, further including an inclined surface between the shoulder and rear step of the pin and the link being formed with a cooperating inclined surface in the opposed faces of the opening slit for displacing the pin away from the outer surface of the camera body when the link is inserted across the axis of the pin.

* * * * *